(12) United States Patent
Li et al.

(10) Patent No.: US 12,671,795 B2
(45) Date of Patent: Jun. 30, 2026

(54) VIDEO DOOR BELL

(71) Applicant: Zhuhai RaySharp Technology Co., Ltd, Zhuhai (CN)

(72) Inventors: Shengjun Li, Zhuhai (CN); Hao Zhang, Zhuhai (CN)

(73) Assignee: Zhuhai RaySharp Technology Co., Ltd, Zhuhai (CN)

( * ) Notice: Subject to any disclaimer, the term of this patent is extended or adjusted under 35 U.S.C. 154(b) by 0 days.

(21) Appl. No.: 18/883,052

(22) Filed: Sep. 12, 2024

(65) Prior Publication Data

US 2026/0039776 A1 Feb. 5, 2026

(30) Foreign Application Priority Data

Jul. 30, 2024 (CN) .......................... 202411032062.0

(51) Int. Cl.
H04N 7/18 (2006.01)
H04N 23/57 (2023.01)

(52) U.S. Cl.
CPC ............. H04N 7/186 (2013.01); H04N 23/57 (2023.01)

(58) Field of Classification Search
CPC ............................... H04N 7/186; H04N 23/57
See application file for complete search history.

(56) References Cited

U.S. PATENT DOCUMENTS

| | | | | | |
|---|---|---|---|---|---|
| 9,740,084 | B1 * | 8/2017 | Mar | ........................ | G03B 29/00 |
| 10,938,294 | B1 * | 3/2021 | Chin | .................... | H04N 23/651 |
| D939,991 | S * | 1/2022 | Yang | .......................... | D10/118.2 |
| 11,599,392 | B1 * | 3/2023 | Huang | .................... | G06V 10/17 |
| 2014/0267716 | A1 * | 9/2014 | Child | ..................... | H04N 7/186 |
| | | | | | 348/143 |
| 2015/0156031 | A1 * | 6/2015 | Fadell | .................. | G08B 27/003 |
| | | | | | 700/90 |
| 2016/0191864 | A1 * | 6/2016 | Siminoff | .............. | H04M 11/025 |
| | | | | | 348/155 |
| 2018/0350225 | A1 * | 12/2018 | Siminoff | .............. | G08B 25/012 |
| 2019/0043325 | A1 * | 2/2019 | Jeon | ................. | G08B 13/19632 |
| 2019/0219223 | A1 * | 7/2019 | Zhou | ..................... | H04N 7/186 |
| 2019/0327449 | A1 * | 10/2019 | Fu | ......................... | H04N 7/0806 |
| 2020/0388118 | A1 * | 12/2020 | Rosenberg | .............. | H02M 1/44 |
| 2022/0271422 | A1 * | 8/2022 | Grillo | .................... | H04N 7/186 |
| 2023/0235761 | A1 * | 7/2023 | Lin | ........................... | F16B 2/02 |
| | | | | | 396/419 |

FOREIGN PATENT DOCUMENTS

| | | | |
|---|---|---|---|
| CN | 103841376 A | | 6/2014 |
| CN | 217693514 U | * | 10/2022 |

\* cited by examiner

*Primary Examiner* — Jared Walker

(57) ABSTRACT

Disclosed is a video door bell, aiming at providing a video door bell which is capable of shooting full-body images, convenient to install and use, and high in security. The video door bell includes a door bell body, a front end face of which has a first inclined surface, wherein a mounting frame is disposed inside the door bell body and has a second inclined surface, an infrared sensor and a lens are disposed on the second inclined surface, the lens is disposed on the first inclined surface, and the first inclined surface, the second inclined surface, the lens, and the infrared sensor are all inclined downward. The present disclosure is applied in the technical field of door bells.

6 Claims, 9 Drawing Sheets

VIDEO DOOR BELL

CROSS-REFERENCE TO RELATED APPLICATIONS

The application claims priority of Chinese patent application CN 202411032062.0, filed on 2024 Jul. 30, which is incorporated herein by reference in its entireties.

TECHNICAL FIELD

The present disclosure relates to a door bell, in particular to a video door bell.

BACKGROUND

At present, with the continuous improvement of safety awareness, more and more residents of residential buildings have video door bells installed at their entrance doors to improve safety. When a visitor stays at the door, the video door bell will collect the information of the visitor through a lens, so that the resident can view the information of the visitor through a mobile terminal. However, when the lens is shooting the visitor, it can only take a half-body photo, and cannot achieve full-body shooting. In order to solve the above technical problem, in the prior art, full-body shooting is implemented by driving a camera of the video door bell to rotate up and down, which results in the video door bell being complex in overall structure and difficult to operate.

SUMMARY

The technical problem to be solved by the present disclosure is to provide a video door bell which is capable of shooting full-body images, convenient to install and use, and high in security, so as to overcome the shortcomings of the prior art.

The technical solution adopted by the present disclosure is as follows: the present disclosure includes a door bell body, where a front end face of the door bell body has a first inclined surface, a mounting frame is disposed inside the door bell body and has a second inclined surface, an infrared sensor and a lens are disposed on the second inclined surface, the lens is disposed on the first inclined surface, and the first inclined surface, the second inclined surface, the lens, and the infrared sensor are all inclined downward.

Further, the door bell further includes a tilted bracket, and the tilted bracket is mounted on a wall; a quick-assembly bracket is disposed on a rear end face of the door bell body, the door bell body is mounted on the tilted bracket by means of the quick-assembly bracket, and the tilted bracket has a symmetrical structure; and two external power connection ports are symmetrically provided on the door bell body.

Further, the quick-assembly bracket is disposed on the rear end face of the door bell body, and the door bell body can be mounted on the wall by means of the quick-assembly bracket.

Further, the door bell body is further internally provided with a main board, and the mounting frame is disposed on the main board; a door bell button is disposed on the front end face of the door bell body, and the door bell button is located below the lens; and the lens, the infrared sensor, and the door bell button are all electrically connected to the main board.

Further, the rear end face of the door bell body is provided with a door bell switch and a charging interface; the quick-assembly bracket has an opening corresponding to the charging interface; and the door bell switch is integrally formed with the door bell body.

Further, the door bell body is provided with a plurality of clamping holes, the quick-assembly bracket is provided with a plurality of clamping blocks, the number of the clamping blocks is the same as that of the clamping holes, and each of the clamping blocks is clamped with the corresponding clamping hole; the door bell body is internally provided with an extendable telescopic clamping block, and the quick-assembly bracket is provided with a clamping slot adapted to the telescopic clamping block correspondingly; a through hole is formed in a bottom of the door bell body; and the telescopic clamping block retracts when an external tool is inserted into the through hole.

Further, the telescopic clamping block includes a clamping block body, a reset elastic member is disposed at the end of the clamping block body away from the clamping slot, and the end of the clamping block body close to the clamping slot can extend out of the door bell body and is matched with the clamping slot; there is an inclined actuating surface on a bottom of the clamping block body; the door bell body is internally provided with a driving block located at the through hole, there is an inclined driving surface on an upper end of the driving block, and the inclined driving surface is abutted against the inclined actuating surface; and the clamping block body moves horizontally toward the direction away from the clamping slot when the inclined driving surface pushes the inclined actuating surface upward.

Further, the quick-assembly bracket is provided with a magnet, and the door bell body is internally provided with an inductive switch induced with the magnet.

Further, the mounting frame includes a first mounting frame and a second mounting frame, the second inclined surface is formed on the first mounting frame, and the infrared sensor is disposed on the second inclined surface through the second mounting frame.

Further, the first mounting frame includes a vertically disposed mounting chassis and obliquely disposed inclined holders, lower ends of the inclined holders are connected to an upper end of the mounting chassis, the second inclined surface is formed on the inclined holders, the inclined holders are clamped to the main board, and the mounting chassis is connected to the main board by screws.

Further, the angle between the lens and the horizontal plane is greater than 0 degrees and less than 90 degrees.

The beneficial effects of the present disclosure are:

Compared with the shortcomings of the prior art, according to the present disclosure, by installing the lens on the first inclined surface, the lens can be tilted downward for shooting, which achieves a better viewing angle and a wider visual range, and significantly enlarges the longitudinal visual range to enable the whole body of a visitor to be shot; moreover, by installing the infrared sensor and the lens on the first inclined surface, the infrared sensor can also be tilted to keep consistent with the direction of the lens, thus ensuring that the lens and the infrared sensor also have a good use effect when being tilted; and therefore, the present disclosure has the advantages of being able to shoot full-body images, and being easy to install and use.

BRIEF DESCRIPTION OF FIGURES

In order to more clearly illustrate the embodiments of the present disclosure or the technical solutions in the prior art, a brief introduction will be given to the accompanying drawings required for the description of the embodiments or the prior art. Apparently, the accompanying drawings described below are merely some but not all of the embodiments of the present disclosure, and for those of ordinary skill in the art, without creative efforts, other drawings can also be obtained based on the structures shown in these drawings.

DESCRIPTION OF REFERENCE NUMERALS

1 denotes a door bell body; 2 denotes a first inclined surface; 3 denotes a first mounting frame; 4 denotes a mounting frame; 5 denotes a second mounting frame; 6 denotes a second inclined surface; 7 denotes an infrared sensor; 8 denotes a lens; 9 denotes a tilted bracket; 10 denotes a quick-assembly bracket; 11 denotes external power connection ports; 12 denotes a main board; 13 denotes a door bell button; 15 denotes a door bell switch; 16 denotes a charging interface; 17 denotes an opening; 18 denotes clamping holes; 19 denotes clamping blocks; 20 denotes a telescopic clamping block; 21 denotes a clamping slot; 22 denotes a through hole; 23 denotes a clamping block body; 25 denotes a reset elastic member; 26 denotes an inclined actuating surface; 27 denotes a driving block; 28 denotes an inclined driving surface; 29 denotes a magnet; 30 denotes a mounting chassis; and 31 denotes inclined holders.

The implementation, functional characteristics, and advantages of the present disclosure will be further described in detail with reference to the accompanying drawings in conjunction with the embodiments.

DETAILED DESCRIPTION

The technical solutions in embodiments of the present disclosure will be described clearly and completely hereinafter with reference to the accompanying drawings in the embodiments of the present disclosure. Apparently, the described embodiments are only a part rather than all of the embodiments of the present disclosure. Based on the embodiments of the present disclosure, all other embodiments obtained by those of ordinary skill in the art without making creative efforts shall fall within the protection scope of the present disclosure.

It should be noted that all directional indications, such as upper, lower, left, right, front, back, clockwise, counterclockwise . . . , in the embodiments of the present disclosure are only used to explain a relative position relationship and motion situation between components in a specific posture. If the specific posture changes, the directional indication also changes accordingly.

In addition, if there are descriptions related to "first", "second", and the like in the present disclosure, the descriptions of "first", "second", and the like are only used for descriptive purposes, and cannot be understood as indicating or implying their relative importance or implying the number of indicated technical features. Therefore, the features defined with "first" and "second" may explicitly or implicitly include at least one of these features. In addition, the technical solutions of various embodiments can be combined with each other, which must be based on what those of ordinary skill in the art can achieve. When the combination of the technical solutions is contradictory or impossible to achieve, it should be considered that the combination of such technical solutions does not exist and is not within the scope of protection of the present disclosure.

Embodiment I

Figure 1:
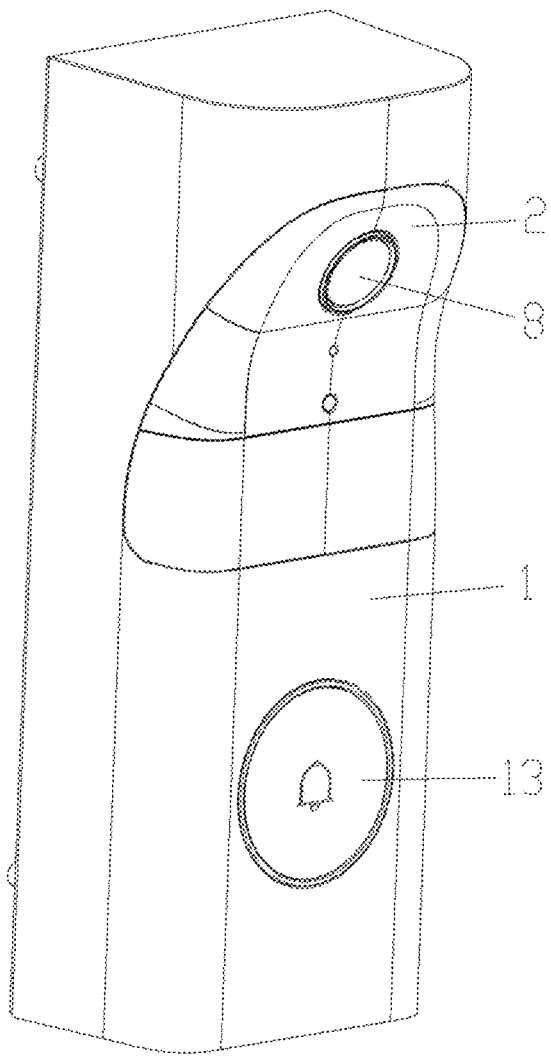
FIG. 1 is a schematic diagram of the three-dimensional structure of the present disclosure.
Figure 2:
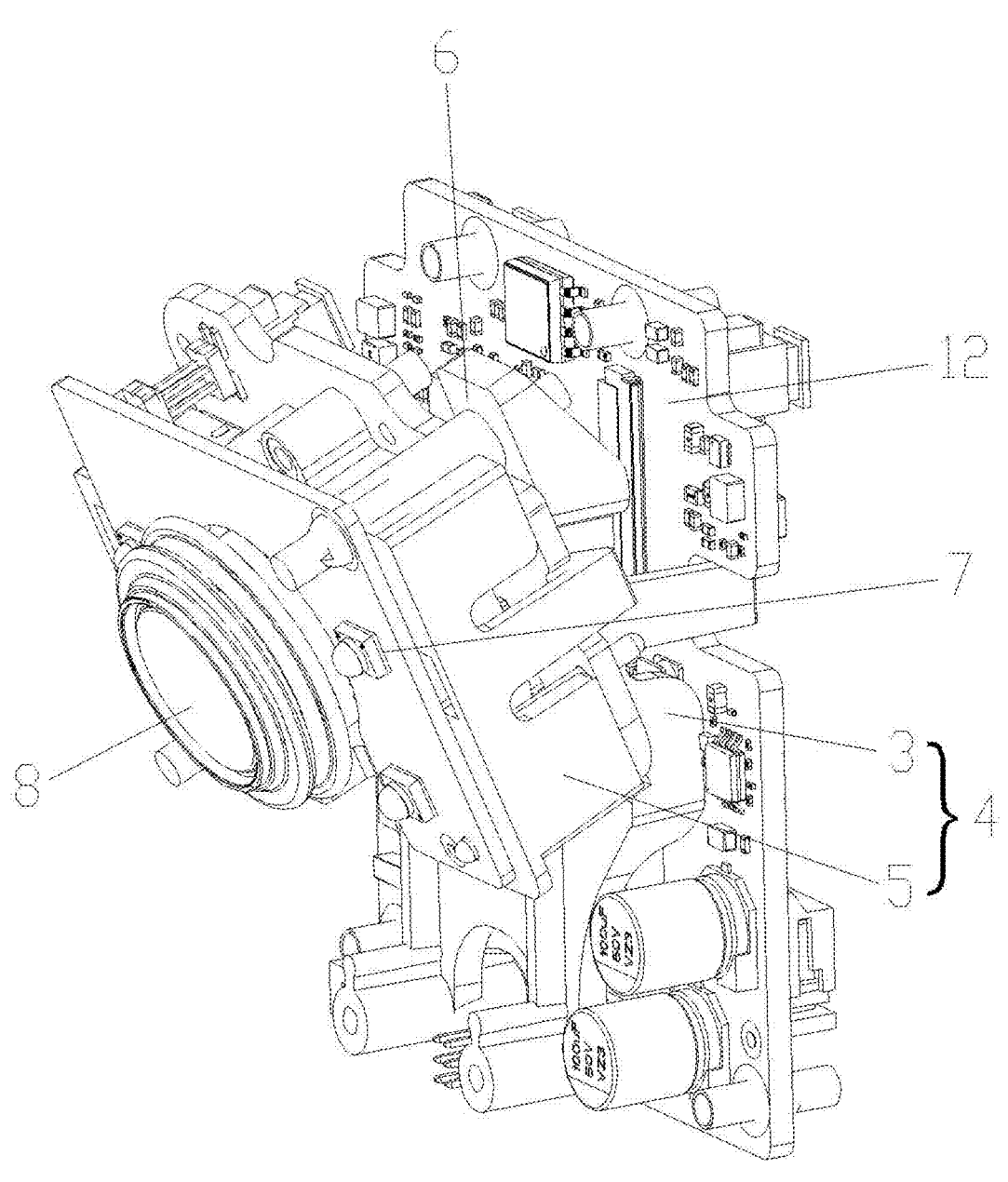
FIG. 2 is a schematic diagram showing the three-dimensional structures of a mounting frame, a lens, and an infrared sensor according to the present disclosure.

As shown in FIG. 1 to FIG. 2, in this embodiment, the present disclosure includes a door bell body 1; a front end face of the door bell body 1 has a first inclined surface 2, a mounting frame 4 is disposed inside the door bell body 1 and has a second inclined surface 6, an infrared sensor 7 and a lens 8 are disposed on the second inclined surface 6, and the lens 8 is disposed on the first inclined surface 2; and the first inclined surface 2, the second inclined surface 6, the lens 8, and the infrared sensor 7 are all inclined downward. The door bell body 1 is also provided with a speaker and a microphone; the infrared sensor 7 is an infrared induction light board, the infrared induction light board is sleeved outside the lens 8, and there is an interstice between the infrared induction light board and the lens 8; and a plurality of infrared induction lights on the infrared induction light board are located on both sides of the lens 8.

Compared with the shortcomings of the prior art, according to the present disclosure, by installing the lens 8 on the first inclined surface 12, the lens 8 can be tilted downward for shooting, which achieves a better viewing angle and a wider visual range, and significantly enlarges the longitudinal visual range to enable the whole body of a visitor to be shot; moreover, by installing the infrared sensor 7 and the lens 8 on the first inclined surface 2, the infrared sensor 7 can also be tilted to keep consistent with the direction of the lens 8, thus ensuring that the lens 8 and the infrared sensor 7 also have a good use effect when being tilted; and therefore, the present disclosure has the advantages of being able to shoot full-body images, and being easy to install and use.

Figure 3:
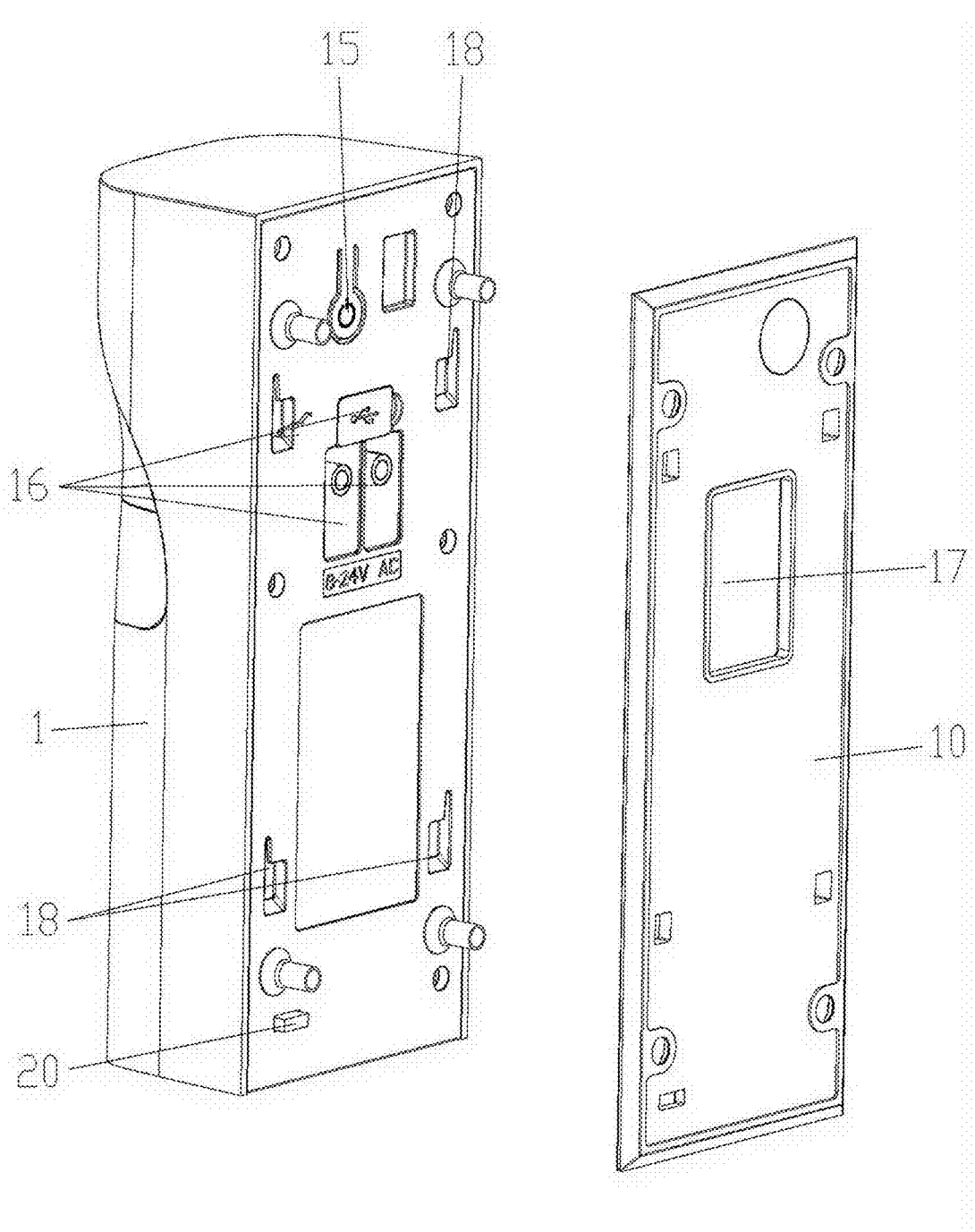
FIG. 3 is an exploded view of a door bell body and a quick-assembly bracket according to the present disclosure.
Figure 4:
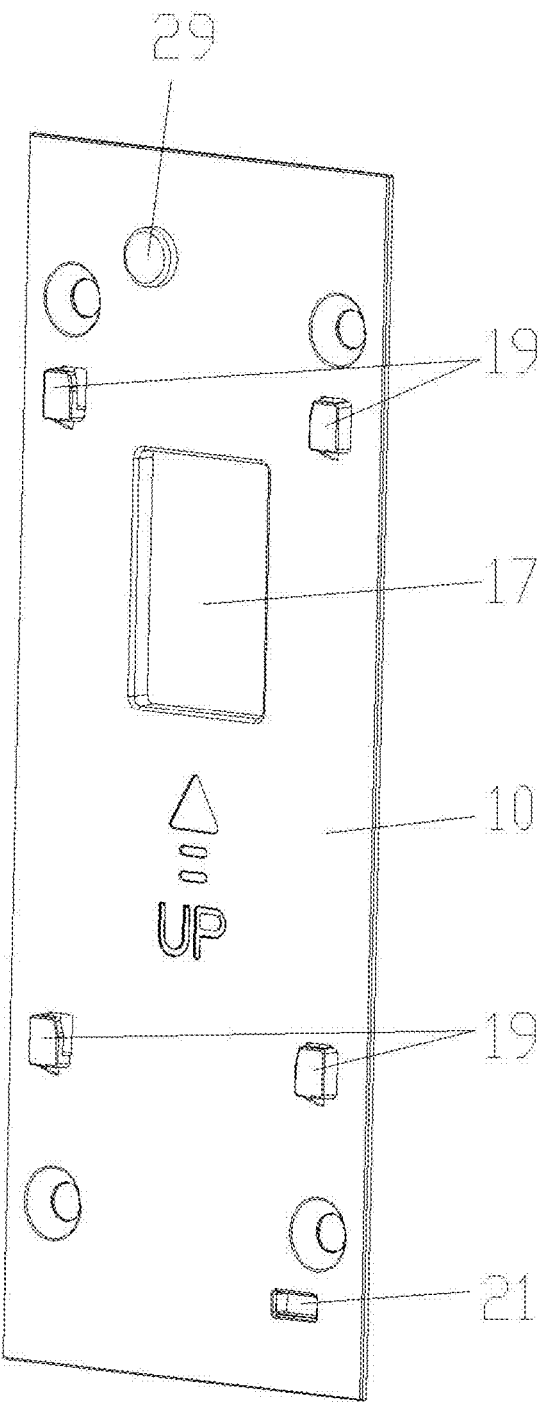
FIG. 4 is a schematic diagram of the three-dimensional structure of the quick-assembly bracket according to the present disclosure.

As shown in FIG. 3 to FIG. 4, in some embodiments, a quick-assembly bracket 10 is disposed on a rear end face of the door bell body 1, and the door bell body 1 is mounted on a wall by means of the quick-assembly bracket 10. Specifically, during installation, the quick-assembly bracket 10 is mounted on the wall by screws and adhesive particles, and thus the door bell body 1 is further mounted on the quick-assembly bracket 10, so as to realize quick installation of a video door bell.

As shown in FIG. 2 to FIG. 3 and FIG. 6 to FIG. 7, in some embodiments, the door bell body 1 is further internally provided with a main board 12, the mounting frame 4 is disposed on the main board 12, a door bell button 13 is disposed on the front end face of the door bell body 1, the door bell button 13 is located below the lens 8, and the lens 8, the infrared sensor 7, and the door bell button 13 are all electrically connected to the main board 12; the rear end face of the door bell body 1 is provided with a door bell switch 15 and a charging interface 16; the quick-assembly bracket 10 has an opening 17 corresponding to the charging interface 16; and the door bell switch 15 is integrally formed with the door bell body 1. The charging interface 16 includes a Type-C interface and an AC interface, and can be connected to an external power source through the above interfaces. Specifically, by integrating the door bell switch 15 with the door bell body 1, the video door bell can save mould costs while achieving the switch function.

Figure 5:
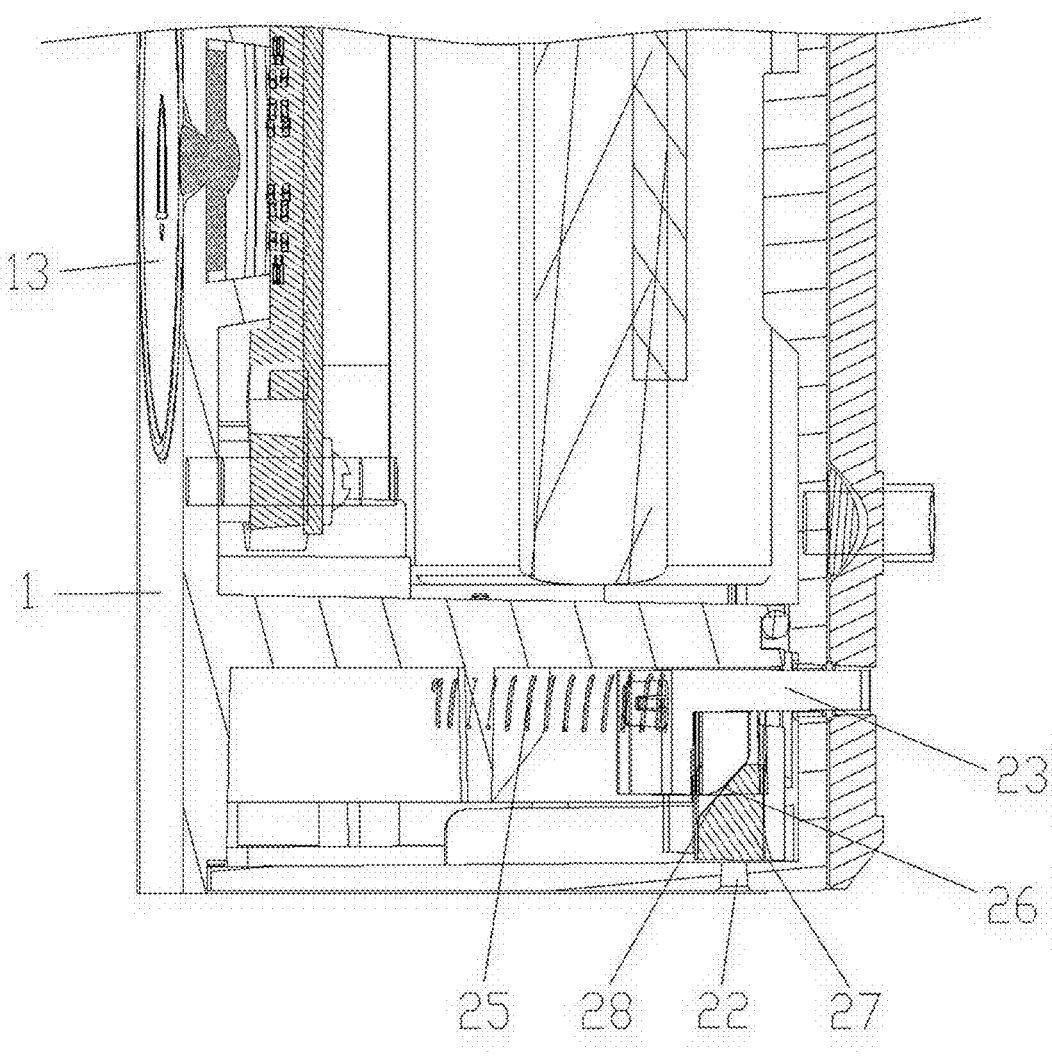
FIG. 5 is a cross-sectional diagram of the present disclosure.

As shown in FIG. 3 to FIG. 5, in some embodiments, the door bell body 1 is provided with a plurality of clamping holes 18, the quick-assembly bracket 10 is provided with a plurality of clamping blocks 19, the number of the clamping blocks is the same as that of the clamping holes 18, and each of the clamping blocks 19 is clamped with the corresponding clamping hole 18; the door bell body 1 is internally provided with an extendable telescopic clamping block 20, and the quick-assembly bracket 10 is provided with a clamping slot 21 adapted to the telescopic clamping block 20 correspondingly; a through hole 22 is formed in a bottom of the door bell body 1; and the telescopic clamping block 20 retracts when an external tool is inserted into the through hole 22. Specifically, during installation, the quick-assembly bracket 10 is installed on the wall, and the door bell body 1 can be quickly clamped with the quick-assembly bracket 10 so as to be firmly connected thereto through the arrangement of the plurality of clamping blocks 19 being respectively clamped into the plurality of clamping holes 18 and the telescopic clamping block 20 being clamped into the clamping slot 21, which can ensure that the door bell body 1 is not easy to loosen and fall off; and when the door bell body 1 needs to be removed, an external tool (e.g., a round rod) can be inserted into the through hole 22 from bottom to top to drive the telescopic clamping block 20 to retract, so that the door bell body 1 is removed. Therefore, due to arrangement of the telescopic clamping block 20, the disassembly and assembly of the door bell body 1 can be facilitated; and the through hole 22 for driving the telescopic clamping block 20 is located at the bottom of the door bell body 1, which can achieve better concealment without affecting the aesthetics of the video door bell.

As shown in FIG. 5, in some embodiments, the telescopic clamping block 20 includes a clamping block body 23, a reset elastic member 25 is disposed at the end of the clamping block body 23 away from the clamping slot 21, and the end of the clamping block body 23 close to the clamping slot 21 can extend out of the door bell body 1 and is matched with the clamping slot 21; there is an inclined actuating surface 26 on a bottom of the clamping block body 23; the door bell body 1 is internally provided with a driving block 27 located at the through hole 22, there is an inclined driving surface 28 on an upper end of the driving block 27, and the inclined driving surface 28 is abutted against the inclined actuating surface 26; and the clamping block body 23 moves horizontally toward the direction away from the clamping slot 21 when the inclined driving surface 28 pushes the inclined actuating surface 26 upward. Specifically, when the door bell body 1 needs to be removed, an external tool (e.g., a round rod) can be inserted into the through hole 22 from bottom to top to push the driving block 27 to move upward. Due to the pushing force of the inclined driving surface 28 on the inclined actuating surface 26, the clamping block body 23 is enabled to move horizontally in a direction away from the clamping slot 21 so as to compress the reset elastic member 25. At this time, the clamping block body 23 retracts to get away from the clamping slot 21, and therefore, the door bell body 1 can be removed. After the external tool is removed, the clamping block body 23 is reset under the action of the elastic force of the reset elastic member 25, and at this time, the clamping block body 23 extends out again.

As shown in FIG. 3 to FIG. 4, in some embodiments, the quick-assembly bracket 10 is provided with a magnet 29, and the door bell body 1 is internally provided with an inductive switch induced with the magnet 29, where the inductive switch is a Hall inductive switch, a groove is provided on the door bell body 1, the magnet 29 located on the quick-assembly bracket 10 can be assembled in the groove, and the groove just faces the inductive switch. Specifically, during normal assembly, the quick-assembly bracket 10 is connected to the door bell body 1, and the inductive switch is in a disconnected state at this point; and when the door bell body 1 is disassembled, the inductive switch will be triggered, and the video door bell will alarm at this time. Therefore, the present disclosure can alarm when the door bell body 1 is forcibly disassembled, thereby having better security.

Figure 6:
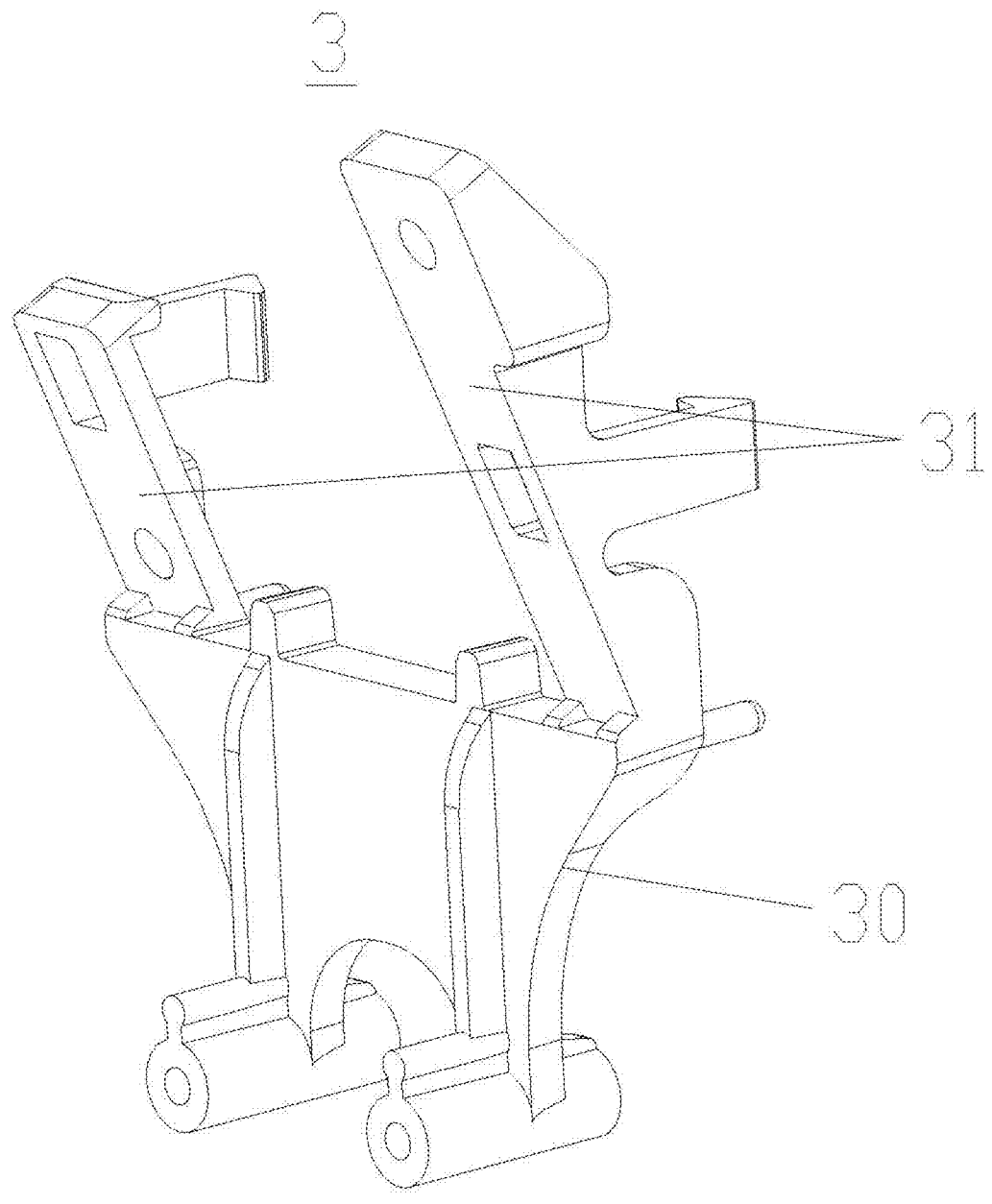
FIG. 6 is a schematic diagram of the three-dimensional structure of a first mounting frame according to the present disclosure.
Figure 7:
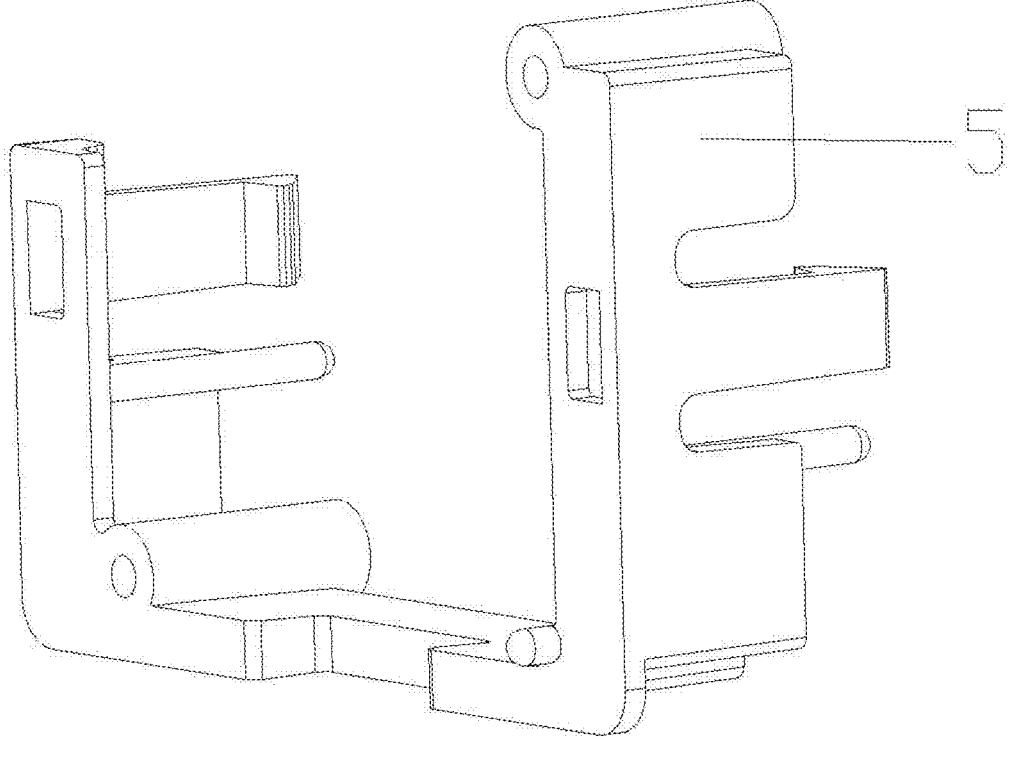
FIG. 7 is a schematic diagram of the three-dimensional structure of a second mounting frame according to the present disclosure.

As shown in FIG. 6 to FIG. 7, in some embodiments, the mounting frame 4 includes a first mounting frame 3 and a second mounting frame 5, the second inclined surface 6 is formed on the first mounting frame 3, and the infrared sensor 7 is disposed on the second inclined surface 6 through the second mounting frame 5. Specifically, by installing the lens 8 and the infrared sensor 7 on the first mounting frame 3 and the second mounting bracket 5 respectively, both the lens 8 and the infrared sensor 7 can be conveniently mounted.

As shown in FIG. 6, in some embodiments, the first mounting frame 3 includes a vertically disposed mounting chassis 30 and obliquely disposed inclined holders 31, lower ends of the inclined holders 31 are connected to an upper end of the mounting chassis 30, the second inclined surface 6 is formed on the inclined holders 31, the inclined holders 31 are clamped to the main board 12, and the mounting chassis 30 is connected to the main board 12 by screws. Specifically, the inclined holders 31 are provided with buckles at both ends, and are clamped to two ends of the main board 12 by means of the buckles; and furthermore, the mounting chassis 30 is connected to the main board 12 by means of screws, so as to achieve stable mounting of the first mounting frame 3, and further ensure that the lens 8 mounted on the first mounting frame 3 can be stable and not easily displaced.

In some embodiments, the angle between the lens 8 and the horizontal plane is greater than 0 degrees and less than 90 degrees. Specifically, by setting the angle between the lens 8 and the horizontal plane to be greater than 0 degrees and less than 90 degrees, a better viewing angle and a wider visual range are achieved.

Embodiment II

Figure 8:
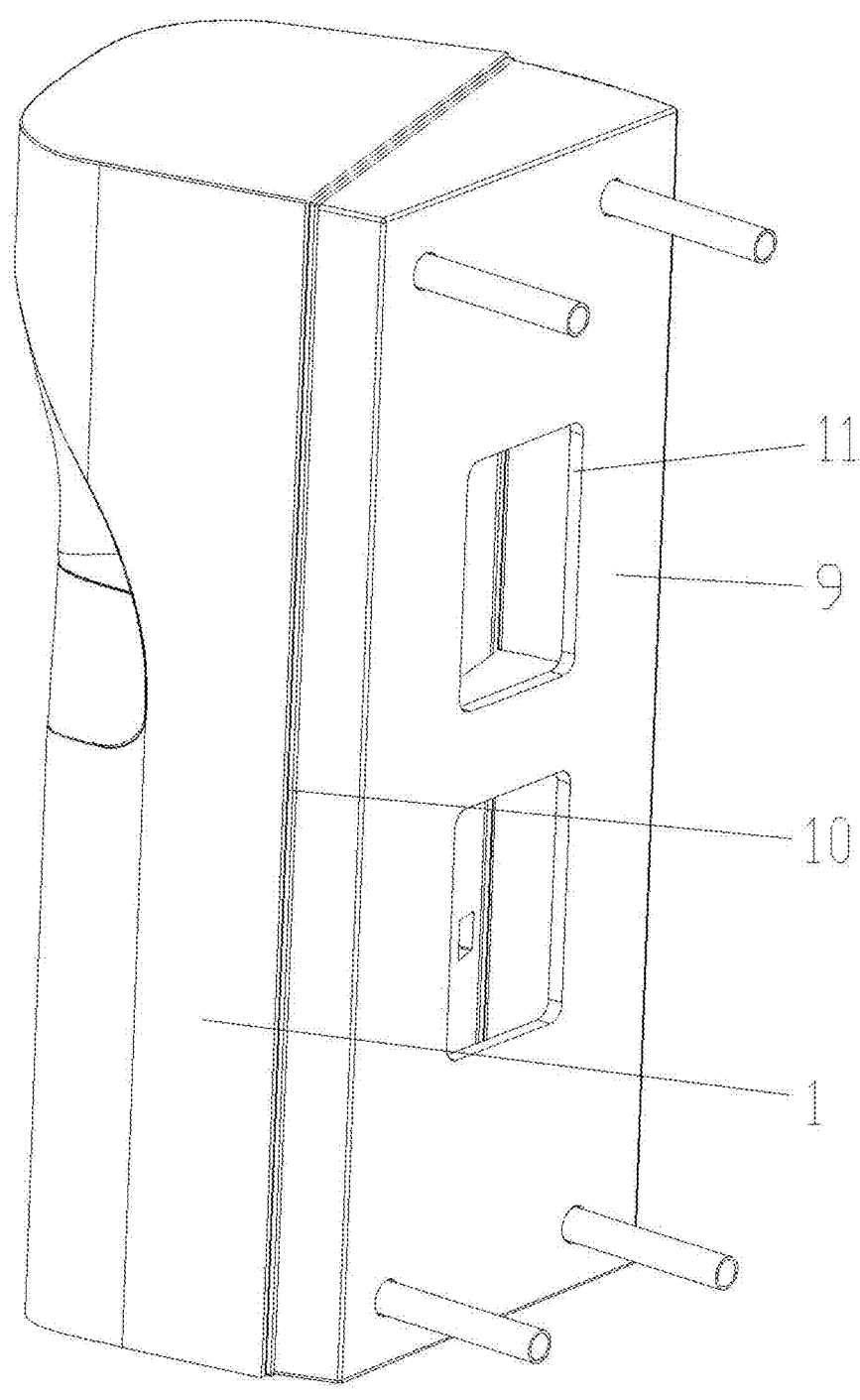
FIG. 8 is a schematic diagram showing the three-dimensional structures of the door bell body and a tilted bracket according to the present disclosure.
Figure 9:
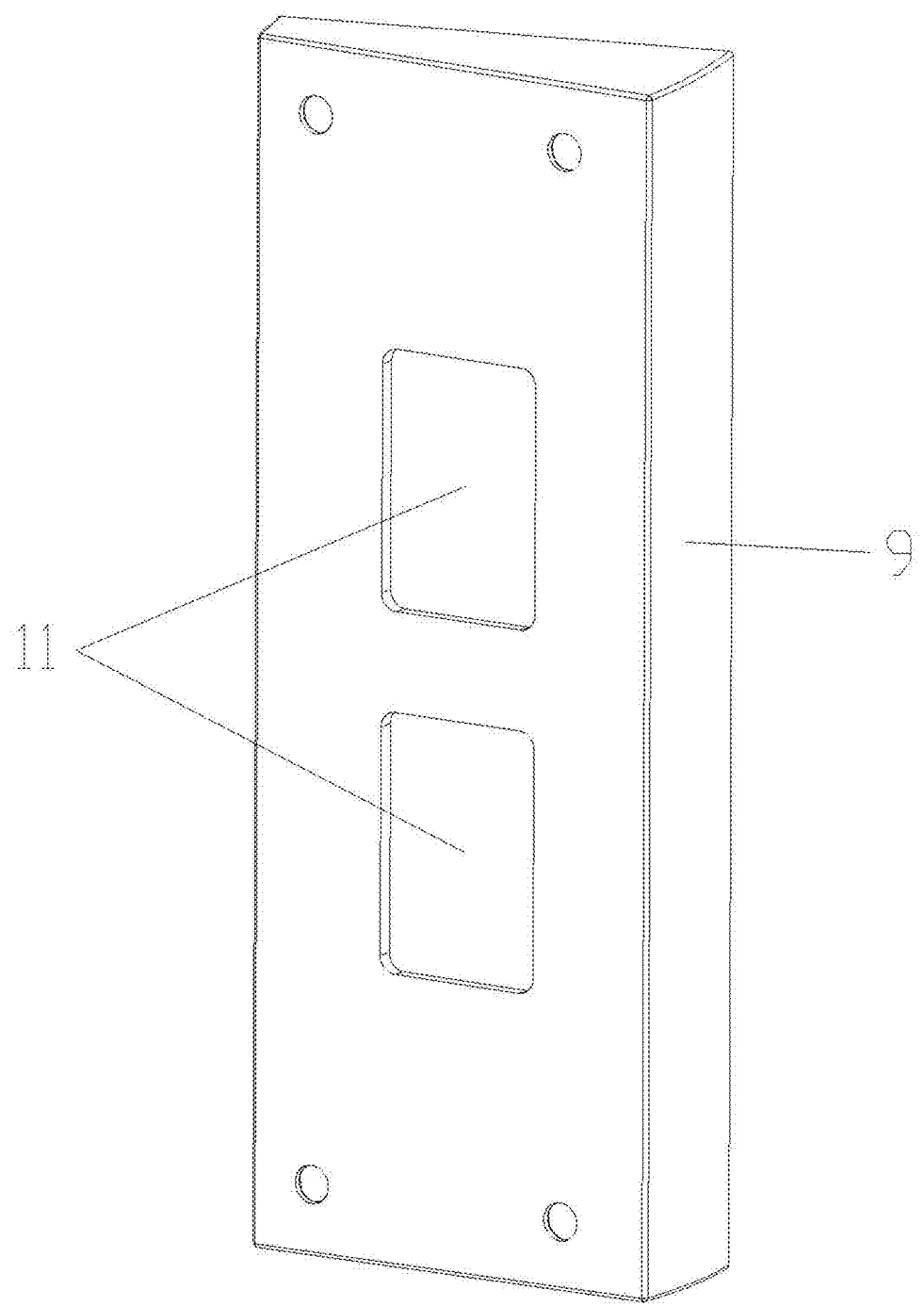
FIG. 9 is a schematic diagram of the three-dimensional structure of the tilted bracket according to the present disclosure.

The difference between Embodiment II and Embodiment I is that: in Embodiment II, the present disclosure also includes the tilted bracket 9 mounted on the wall, and the quick-assembly bracket 10 is not installed on the wall, but is installed on the tilted bracket 9. Specifically:

As shown in FIG. 8 to FIG. 9, in this embodiment, the door bell further includes the tilted bracket 9, and the tilted bracket 9 is mounted on the wall; the quick-assembly bracket 10 is disposed on the rear end face of the door bell body 1, the door bell body 1 is mounted on the tilted bracket 9 by means of the quick-assembly bracket 10, and the tilted bracket 9 has a symmetrical structure; and the two external power connection ports 11 are symmetrically provided on the door bell body 1. Specifically, the tilted bracket 9 is a bracket that tilts 15 degrees towards the side end. Due to its symmetrical structure, the tilted bracket 9 can be compatible with either a left or right orientation, making it easy to install the video door bell on the wall at the side where an entrance door is located or on the wall at side opposite to the entrance door through the tilted bracket 9; and moreover, by symmetrically setting the two external power connection ports 11, it is compatible with the symmetrical structure of the tilted bracket 9, so that when being installed towards left or right, the tilted bracket 9 can be connected through the corresponding external power connection port 11 without affecting the connection of the external power source.

It should be noted that the materials of some entrance doors (such as stainless steel doors) are not suitable for installing video door bells, or installing the video door bells on the entrance doors with 3M adhesive tapes may result in insufficient security, which means that the video door bells installed on the walls should have better security and can be easily installed. However, when a video door bell is installed on the wall at the side where an entrance door is located or on the wall at side opposite to the entrance door, the video door bell is not directly facing the front of the entrance door, and thus the shooting angle is not good in the case where a visitor stands directly in front of the entrance door. Therefore, the present disclosure can realize the wall built-in type installation of the video door bell through the tilted bracket 9, so that the lens 8 is enabled to face the visitor standing directly in front of the entrance door, which not only achieves a better shooting angle for the visitor standing directly in front of the entrance door, but also makes it possible to decide, according to the actual position of the entrance door, whether the video door bell is installed on the wall at the side where the entrance door is located or on the wall at side opposite to the entrance door.

The foregoing descriptions are merely exemplary embodiments of the present disclosure, and are not intended to limit the scope of the present disclosure. Under the inventive concept of the present disclosure, any equivalent structural transformation made by using the contents of the description and drawings of the present disclosure, or direct/ indirect application of the contents of the description and drawings in other related technical fields shall be included in the patent protection scope of the present disclosure.

The invention claimed is:

1. A video door bell, comprising: a door bell body, wherein a front end face of the door bell body has a first inclined surface, a mounting frame is disposed inside the door bell body and has a second inclined surface, an infrared sensor and a lens are disposed on the second inclined surface, the lens is disposed on the first inclined surface, and the first inclined surface, the second inclined surface, the lens, and the infrared sensor are all inclined downward; wherein a quick-assembly bracket is disposed on the rear end face of the door bell body, and the door bell body can be mounted on the wall by means of the quick-assembly bracket, or the door bell body can be mounted on a tilted bracket on the wall by means of the quick-assembly bracket;

the door bell body is further internally provided with a main board, the mounting frame is disposed on the main board, a door bell button is disposed on the front end face of the door bell body, the door bell button is located below the lens, and the lens, the infrared sensor, and the door bell button are all electrically connected to the main board; the rear end face of the door bell body is provided with a door bell switch and a charging interface; the quick-assembly bracket has an opening corresponding to the charging interface; and the door bell switch is integrally formed with the door bell body;

the door bell body is provided with a plurality of clamping holes, the quick-assembly bracket is provided with a plurality of clamping blocks, the number of the clamping blocks is the same as that of the clamping holes, and each of the clamping blocks is clamped with the corresponding clamping hole; the door bell body is internally provided with an extendable telescopic clamping block, and the quick-assembly bracket is provided with a clamping slot adapted to the telescopic clamping block correspondingly; a through hole is formed in a bottom of the door bell body; and the telescopic clamping block retracts when an external tool is inserted into the through hole.

2. The video door bell according to claim 1, wherein the telescopic clamping block comprises a clamping block body, a reset elastic member is disposed at the end of the clamping block body away from the clamping slot, and the end of the clamping block body close to the clamping slot can extend out of the door bell body and is matched with the clamping slot; there is an inclined actuating surface on a bottom of the clamping block body; the door bell body is internally provided with a driving block located at the through hole, there is an inclined driving surface on an upper end of the driving block, and the inclined driving surface is abutted against the inclined actuating surface; and the clamping block body moves horizontally toward the direction away from the clamping slot when the inclined driving surface pushes the inclined actuating surface upward.

3. The video door bell according to claim 1, wherein the quick-assembly bracket is provided with a magnet, and the door bell body is internally provided with an inductive switch induced with the magnet.

4. The video door bell according to claim 1, wherein the mounting frame comprises a first mounting frame and a second mounting frame, the second inclined surface is formed on the first mounting frame, and the infrared sensor is disposed on the second inclined surface through the second mounting frame.

5. The video door bell according to claim 4, wherein the first mounting frame comprises a vertically disposed mounting chassis and obliquely disposed inclined holders, lower ends of the inclined holders are connected to an upper end of the mounting chassis, the second inclined surface is formed on the inclined holders, the inclined holders are clamped to the main board, and the mounting chassis is connected to the main board by screws.

6. The video door bell according to claim 1, wherein the angle between the lens and the horizontal plane is greater than 0 degrees and less than 90 degrees.

\* \* \* \* \*